Patented May 14, 1929.

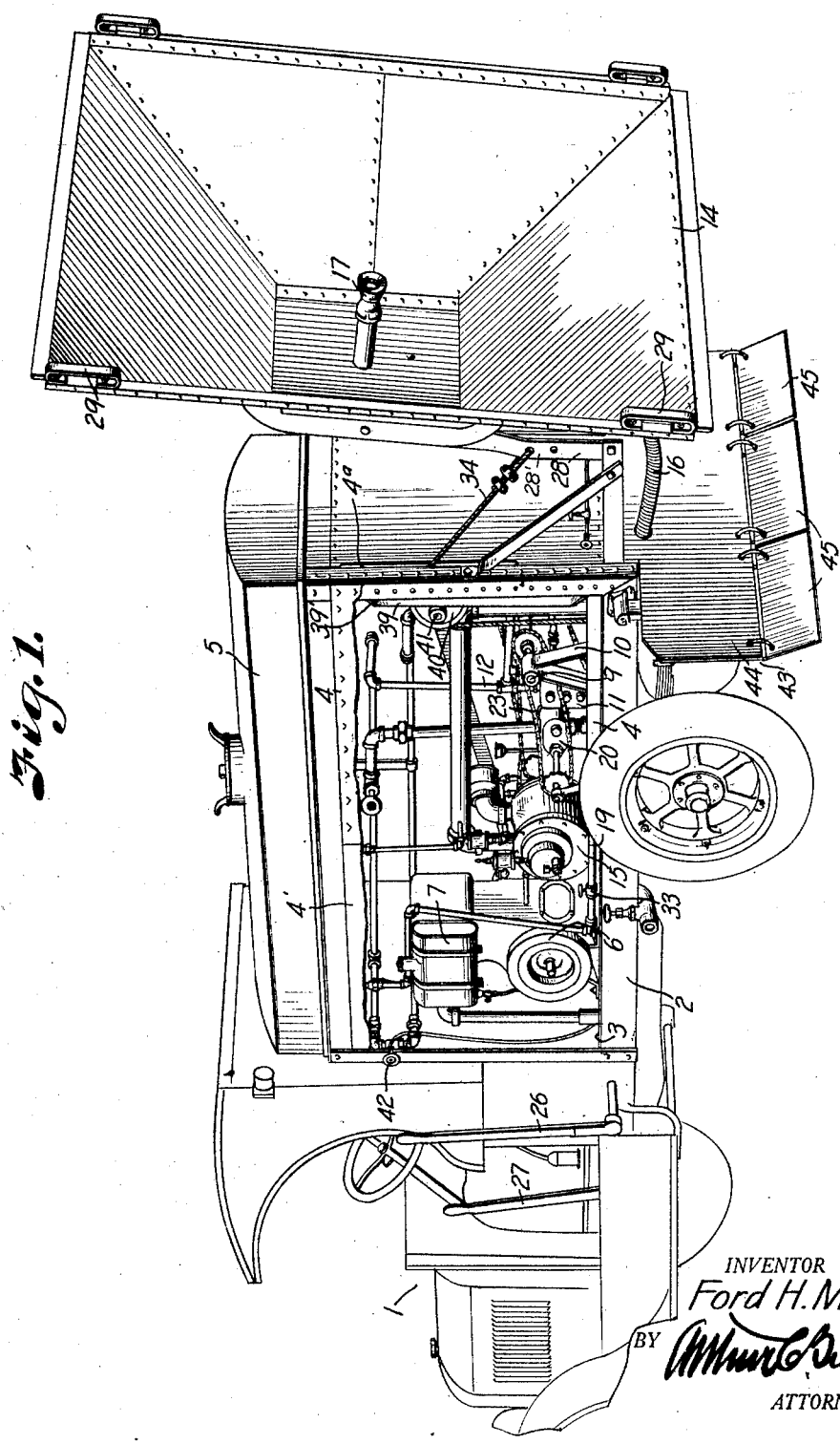

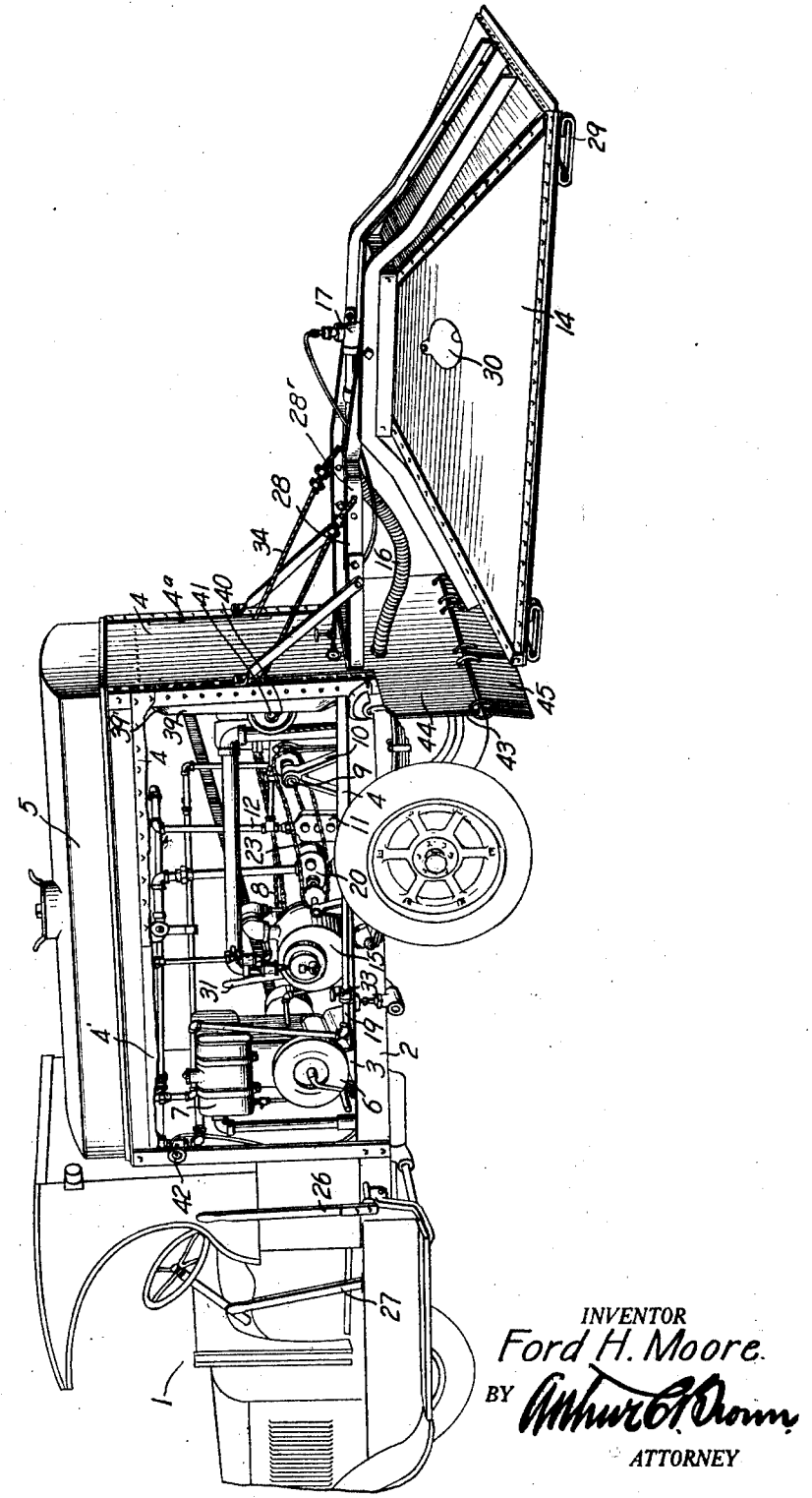

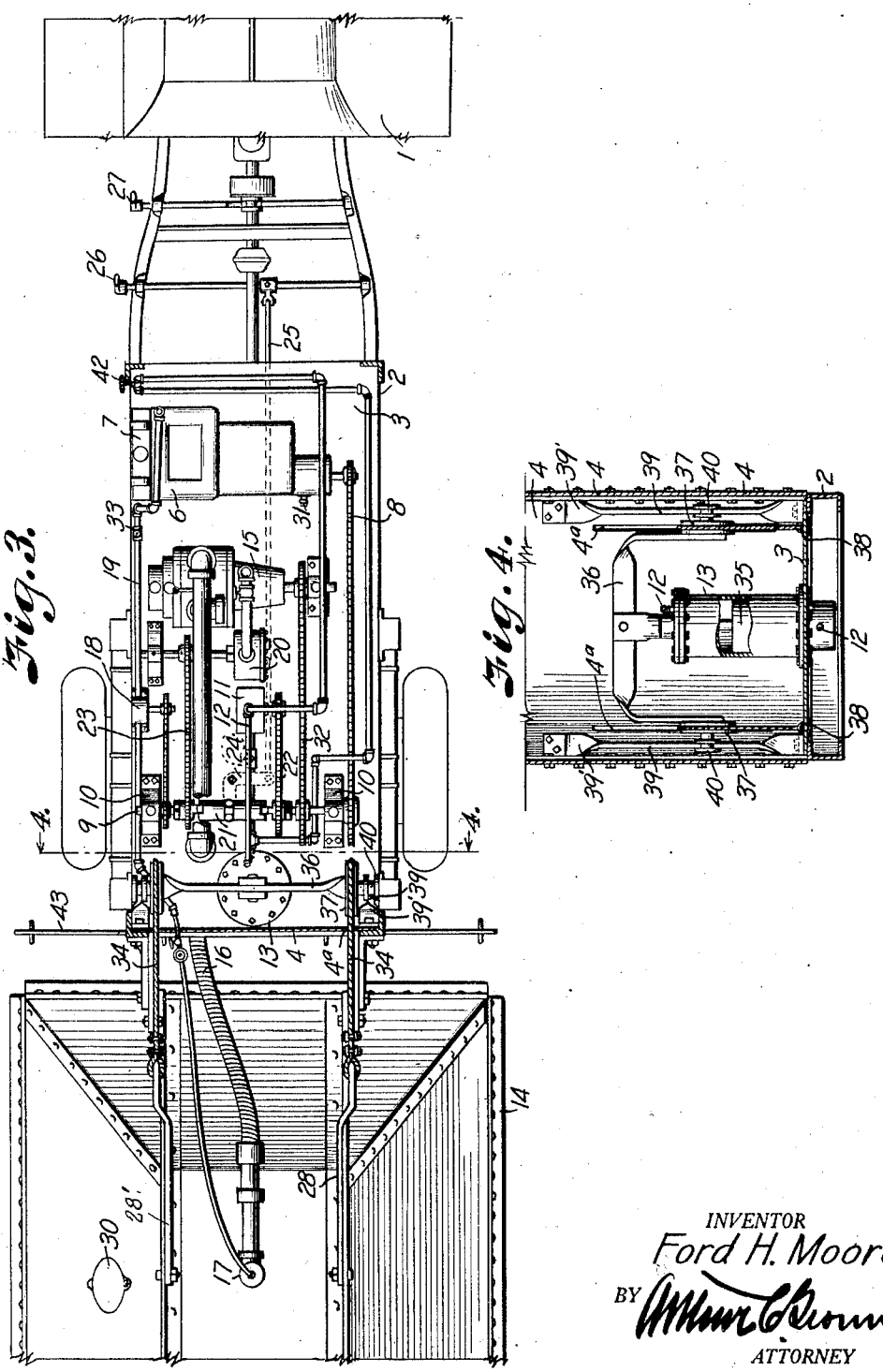

1,712,629

UNITED STATES PATENT OFFICE.

FORD H. MOORE, OF KANSAS CITY, MISSOURI.

SURFACE HEATER.

Application filed January 26, 1927. Serial No. 163,689.

My invention relates to surface heaters and more particularly to vehicles equipped with apparatus for discharging heat into a hood that directs the heat to the ground.

My purpose is to provide apparatus that can be erected on and associated with a motor truck chassis and having novel and improved means for supplying heat and adjusting the heater hood.

Heretofore surface heaters have usually comprised integral devices, the vehicular element being constructed specially for association therewith of the elements for applying heat to a surface. My provision of equipment that may be built on a motor truck will tend to render the surface heater more easily available. The designing of my invention has produced additional advantageous features, particularly my arrangement for lifting and lowering the hood and storing it vertically when not in use. These and other improved features because of which the surface heater may be operated more efficiently, conveniently and economically will be described in detail with references to the drawings in which:

Fig. 1 is a perspective view of a motor truck chassis equipped with my device, the heater hood raised.

Fig. 2 is a similar perspective view showing the hood in operative position.

Fig. 3 is a plan view of the device.

Fig. 4 is a detail view of the hydraulic mechanism for lifting the hood.

Referring in detail to the drawings:

1 designates generically a motor truck chassis on the frame 2 of which is laid a bed plate 3 surmounted by preferably sheet iron walls 4 having slidable sections 4' and suitable slots 4ª for purposes later to be described, the sheet iron walls forming with the superposed fuel tank 5ª relatively air tight box or enclosure for the protection of the actuating elements of my device presently to be described and for other purposes. A special source of power is provided, independent of the motive power of the truck, namely an engine 6 supplied with fuel by a tank 7 and connected through belt 8 with a countershaft 9 supported by bearings 10 mounted on the bed plate at the rear end of the truck. Through the countershaft 9 the engine transmits energy to the several actuating elements, namely, a hydraulic pump 11 operated by fluid carried in the pipes 12 on the jack 13 for lifting and lowering a hood 14, a blower 15 supplying air through the tube 16 to the burner 17 mounted in the hood, a fuel pump 18 in the supply pipe line 19 through which oil is supplied to the burner from the tank 5, and an auxiliary fuel oil pump 20 whereby oil is delivered from an outside source to the tank 5; the said several elements to be presently more particularly described.

A sleeve 21 mounted on the countershaft is slidable therealong for dog clutch engagement with the gearing 22 for actuation of the hydraulic pump 11 and oppositely for engagement with the gearing 23 for actuation of the fuel tank supply pump 20, through operative connection of the sleeve with the bell crank lever 24 as rotated in one or another direction through the pull rod 25 operated by the lever 26 pivoted on the chassis. I wish to call special attention to the positioning of the lever 26, and refer to its utility as so positioned, in making possible safe and efficient one-man operation of my device. The operator having brought the truck to a scene of work, dismounts, leaving his truck engine running. A truck clutch lever 27 positioned adjacent the edge of the chassis provides convenient means for stopping and driving the truck while he is mounted on the chassis or while he is walking beside it. The lever 26 and other control devices which will be mentioned are close at hand for his manipulation.

The hood is secured to the chassis by hinged arms 28 and is provided with skids 29 to facilitate its travel in functioning position as shown in Fig. 2, while being dragged by the moving truck over successive patches of surface. A window 30 permits access to the lowered hood for lighting the fuel mixture delivered to the burner.

The operator induces a flow of fuel to the burner by starting the engine 6, operating lever 31 inside the box to engage the gearing 32 of the blower with the countershaft, and turning valve 33 to admit fuel oil to the line 19 and pump 18, the pump 18 operating continuously while the engine is running.

The hood is pivotally elevated to vertical position when the machine is to be moved to a different place of operation, and in elevating the hood the lever 26 is shifted to cause functioning of the hydraulic pump and jack which retract ropes 34 engaged with the intermediate portions 28' of the hinged arms 28. The structure for accomplishing this result constitutes a special feature of my device. The jack 13 comprises a piston 35 and a yoke 36 carried by the piston head, the fluid propelled by the hydraulic pump 11 entering the lower end of the piston for forcing the yoke upward. Pivoted on the ends of the yoke are pulleys 37 over which run the ropes 34, the inner ends of which are secured to the bed plate at 38. The yoke traveling upward lengthens the secured ends of the ropes and shortens the ends attached to the hood, moving the hood to a desired position. The arrangement therefore provides a maximum lift distance in a minimum of vertical space, a desirable feature in a device of this kind. Guides 39 are provided for the yoke and stabilizing of the elements under stress, being rails 39' mounted on the walls, over which run deeply flanged wheels 40 pivoted on the spindles 41 of the pulleys.

The device is positively actuated for lifting the hood by the forward forcing of the lever 26 to cause rotation of the shaft 9 and functioning of the hydraulic pump to raise the hydraulic jack and rope-carrying pulleys. Pressure on the jack piston is relieved and the yoke permitted to fall for permitting the hood to sink to functioning position over a surface by opening a valve 42 exterior to the chassis, and, like the other control elements, convenient to the hand of the operator walking beside the truck. The weight of the hood is prevented from producing an abrupt fall thereof by checking action of the fluid in the hydraulic lines, the restricted outflow of the fluid serving to resist the downward movement of the hood.

Another useful feature of my device is a baffle element 43 comprising metal plate 44 attached to the chassis and depending therefrom and depending sections 45, the baffle protecting the wheels of the truck from the heat radiating from the hood. The baffle is provided with the linked depending sections to be dragged along the ground for permitting greater extension downward of the said baffle than would be convenient with the use of an integral plate. The baffle is also useful as further constricting the effective heating area of the burner.

Suitable means of a conventional character are provided to secure incidental results of operation and to control equipment which may not be specifically described; and adaptations may be made in the described construction to provide for efficient operation under varying conditions. The tubes and pipes conducting the fluids or air will be of such structure as their use in the parts of the vehicle they occupy would suggest, for example, the blower tubes and fuel oil pipe being flexible through their sections extending outside of the box enclosure and therefore subject to distortion by the changing position of the hood in adjustment. The sheet iron walls of the boxlike enclosure would preferably be provided with sections slidable past others, or removable, as suggested at 4' in Fig. 1, for permitting access to the interior. The box is, however, relatively air-tight, so that the blower delivering air to the burner takes from within the box air that has been heated by the engine and by any cooling medium that may be provided therefor, and draws cooler outside air into the box through the perforations in the walls provided for the admission of ropes, levers, etc.

What I claim and desire to secure by Letters-Patent is:

1. In combination with a motor truck platform, a supporting frame on the platform including side walls forming a housing, a fuel tank on the frame constituting a cover for the housing, a hood supported from the end of said frame and provided with a burner, a fuel line leading from the tank to the exterior of the housing and including a pump, a blower in the housing including a conduit leading to the exterior of the housing, a motor in the housing for actuating the pump and blower, and flexible tubes connecting the fuel line and blower conduit with the burner for supplying the fuel elements to the burner.

2. In combination with a motor truck platform, a supporting frame on the platform including side walls forming a housing, a fuel tank on the frame constituting a cover for the housing, a hood supported from the end of said frame, a burner in the hood, a baffle plate depending from the end of the frame adjacent the hood, a fuel line leading from the tank to the exterior of the housing, a pump interposed in said fuel line within the housing, a blower in the housing including a conduit leading to the exterior of the housing, a motor in the housing for actuating the pump and blower, and flexible conduits connecting the fuel line and blower conduit with the burner for delivering the fuel elements to the burner.

In testimony whereof I affix my signature.

FORD H. MOORE.